United States Patent
Ardron

(10) Patent No.: US 8,868,892 B2
(45) Date of Patent: Oct. 21, 2014

(54) METHOD AND APPARATUS FOR SELECTIVE HEATING FOR ELECTRONIC COMPONENTS OF A HANDHELD DEVICE

(75) Inventor: David Neil Ardron, Georgetown (CA)

(73) Assignee: Psion Inc., Mississauga, Ontario (CA)

( * ) Notice: Subject to any disclaimer, the term of this patent is extended or adjusted under 35 U.S.C. 154(b) by 617 days.

(21) Appl. No.: 12/974,547

(22) Filed: Dec. 21, 2010

(65) Prior Publication Data

US 2012/0159200 A1    Jun. 21, 2012

(51) Int. Cl.
G06F 9/46    (2006.01)
G06F 1/20    (2006.01)

(52) U.S. Cl.
CPC .................................. G06F 1/206 (2013.01)
USPC ...... 713/1; 713/2; 700/79; 700/299; 700/300; 360/75

(58) Field of Classification Search
USPC ........ 713/1, 2, 100; 700/79, 299–300; 360/75
See application file for complete search history.

(56) References Cited

U.S. PATENT DOCUMENTS

| | | | |
|---|---|---|---|
| 6,169,930 B1 * | 1/2001 | Blachek et al. ................ 700/79 |
| 7,111,179 B1 | 9/2006 | Girson et al. | |
| 7,136,247 B2 * | 11/2006 | Escobar et al. ................ 360/69 |
| 7,203,021 B1 * | 4/2007 | Ryan et al. ...................... 360/75 |
| 7,366,921 B2 | 4/2008 | Ranganathan | |
| 7,464,278 B2 | 12/2008 | Cohen et al. | |
| 7,641,386 B2 * | 1/2010 | Chen et al. ..................... 374/141 |
| 7,706,929 B2 * | 4/2010 | Chiu ............................. 700/300 |
| 7,788,516 B2 | 8/2010 | Conroy et al. | |
| 7,895,459 B2 | 2/2011 | Goodnow et al. | |
| 8,078,864 B2 * | 12/2011 | Lin et al. .......................... 713/2 |
| 8,176,308 B2 * | 5/2012 | Chiu ............................... 713/2 |
| 8,200,993 B2 * | 6/2012 | Chiu ............................. 713/300 |
| 8,364,940 B2 * | 1/2013 | Belady et al. ..................... 713/1 |
| 2009/0198387 A1 * | 8/2009 | Lin et al. ....................... 700/300 |
| 2010/0070745 A1 * | 3/2010 | Chiu ................................. 713/2 |
| 2011/0296155 A1 * | 12/2011 | Belady et al. ..................... 713/2 |

OTHER PUBLICATIONS

Non-Final Office Action mailed Jan. 18, 2012 in U.S Appl. No. 12/765,912, David Forsythe Lawrence, filed Apr. 23, 2010.

* cited by examiner

Primary Examiner — M Elamin

(57) ABSTRACT

A method and apparatus for thermal management of components and functional subsystems of a handheld device, including for a peripheral device electrically coupled to thereto. A power source provides power to a plurality of functional subsystems of the handheld device and optionally the peripheral device. The components and functional subsystems comprise predetermined thermal signatures.

16 Claims, 4 Drawing Sheets

METHOD AND APPARATUS FOR SELECTIVE HEATING FOR ELECTRONIC COMPONENTS OF A HANDHELD DEVICE

FIELD

The present disclosure relates generally to a method and apparatus for thermal management in handheld computer devices, more specifically selective heating of electronic components of a handheld computer device, including electronic components in peripheral devices electrically coupled thereto.

BACKGROUND

Given the proliferation of handheld mobile computing devices, thermal management has become an important factor in enhancing their usefulness. The availability of a wide number of peripheral devices has also contributed to the widespread adoption of handheld computers. Available peripheral devices may include optical scanning devices including barcode laser scanners, digital photo and document scanners, Global Positioning System (GPS) receivers, MPEG audio layer 3 (MP3) players and digital cameras, and much more. Increasingly, such peripheral devices and their respective functionality are being incorporated into the handheld devices.

When such handheld computer devices are operated in cold or subzero temperature environments, proper functioning of their constituent components, both electronic and mechanical, including functional subsystems incorporating multiple electronic components, operation and functioning of the device itself, may be adversely affected. For example, for a given electronic component or functional subsystem of the mobile handheld device, such as display screen, Wi-Fi radio subsystem, keyboard and optical scanner, being operated in subzero environments where the ambient temperature is below the manufacturer's specified minimum operational temperature, malfunctioning of that component becomes a realistic concern.

It is known to provide auxiliary heating sources via devices for coupling externally to the handheld, or even to incorporate further component heating infrastructure within the enclosure of the handheld computer. However, these solutions add physical bulk, as well heating infrastructure complexity with attendant inherent decreased reliability, and also increased peak power requirements. It would therefore be desirable to provide a system and method which does not require any special or additional heating infrastructure for heating the components and functional subsystems of the handheld computer as required for proper operation in subzero temperatures.

SUMMARY OF THE INVENTION

Provided is a method of providing thermal management for a handheld device powered by a power source, the power source having an available power amount, the handheld device comprising a plurality of functional subsystems. The method comprises receiving an indication of a thermal management event at the handheld device related to heating of at least one functional subsystem of the plurality of functional subsystems, the at least one functional subsystem having a predetermined minimum operating temperature; delaying start of normal operation of the handheld device involving the at least one functional subsystem; identifying a predetermined thermal signature associated with operation of the at least one functional subsystem; and applying a heating current to heat the at least one functional subsystem of the handheld device.

Also provided is a handheld device comprising a processor, an expansion port for coupling peripheral devices to the handheld device, the expansion port coupled to the processor, a battery power source comprising an available power amount, the battery source for powering a plurality of functional subsystems of the handheld device, and a memory coupled to the processor having instructions stored thereon for execution by the processor. The memory comprises instructions for receiving an indication of a thermal management event at the handheld device related to heating of at least one functional subsystem of the plurality of functional subsystems, the at least one functional subsystem having a predetermined minimum operating temperature, delaying start of normal operation of the handheld device involving the at least one functional subsystem, identifying a predetermined thermal signature associated with operation of the at least one functional subsystem, and applying a heating current to heat the at least one functional subsystem of the handheld device.

BRIEF DESCRIPTION OF THE DRAWINGS

Embodiments will now be described by way of example only, with reference to the following drawings in which.

DETAILED DESCRIPTION

As used herein, the term "thermal management" refers to a set of hardware, firmware, and system software, employed in any combination thereof to accomplish efficient allocation and utilization of electrical power supplied by a power source or battery of a handheld device in order ensure proper functioning of constituent components and functional subsystems in extreme or subzero temperatures. The exemplary context provided herein comprises desired operation of the handheld device in very cold ambient temperatures, such as when the ambient temperature is even lower than the specified minimum operational temperature for any components and functional subsystems of the handheld device, including peripheral devices coupled thereto. The computational needs of the user may involve, for instance, a desire for simultaneous operation, or partially simultaneous operation, of the different functional subsystems, such as the display screen, keyboard, short-range wireless communication radio, optical scanner and peripheral expansion ports of the handheld device while in such cold ambient conditions. Utility to a user under such conditions necessarily depends upon proper, accurate functioning of all the components and functional subsystems of the handheld computer device and attached peripheral devices.

Thermal management in this context seeks to provide an enhanced allocation of available power and electrical current, sufficient for effective component heating, among the competing components and functional subsystems of the handheld device in a manner which is aligned with the needs and priorities of the user of the handheld computer device. By allocating electrical current to a component, the component having an inherent thermal resistivity and thermal mass, the electrical power applied thereto is proportionally dissipated as heat, resulting in an increased component temperature. Furthermore, it is advantageous to provide that enhanced allocation or sharing of electrical power in a manner which is unobtrusive and convenient to the user, and also in a manner which does not add physical bulk and complexity, such as by adding high-power dissipation resistors, to the handheld devices and peripherals.

Figure 1:
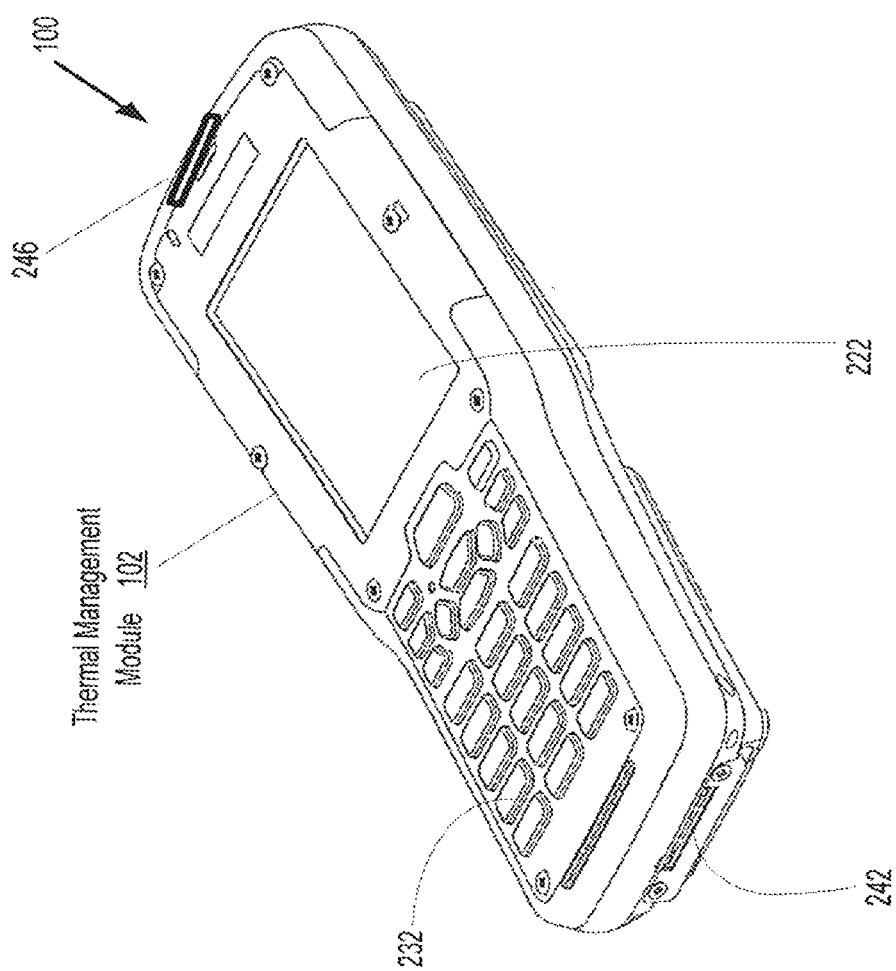
FIG. 1 illustrates an exemplary handheld device including thermal management capability for heating of components and functional subsystems incorporated therein.

Referring now more particularly to the accompanying figures, FIG. 1 illustrates an exemplary embodiment of a handheld device indicated generally at 100. As used herein, the term handheld device is intended to include, without limitation, devices such as handheld computers, mobile computers, and mobile electronic devices. The handheld device may have the capability of wirelessly communicating at least data, and possibly both data and audio, to and from servers as well as data acquisition sources within a communication network.

Handheld device 100 may include keyboard 232 for user input, display screen 222, scanner exit window 246 for incorporated optical scanning functionality, thermal management module 102 and expansion port 242. Thermal management module 102, described in further detail below, may comprise a set of hardware, firmware, and system software, employed in any combination thereof to accomplish enhanced and efficient allocation and utilization of electrical power supplied by a power source of the handheld device in meeting the computational or data communication needs of the user of handheld device 100. Expansion port 242 may be an exemplary Universal Serial Bus (USB) port or other similar expansion port for coupling compatible peripheral devices, such as, but not limited to, a communication and synchronization cradle for handheld device 100.

Figure 2:
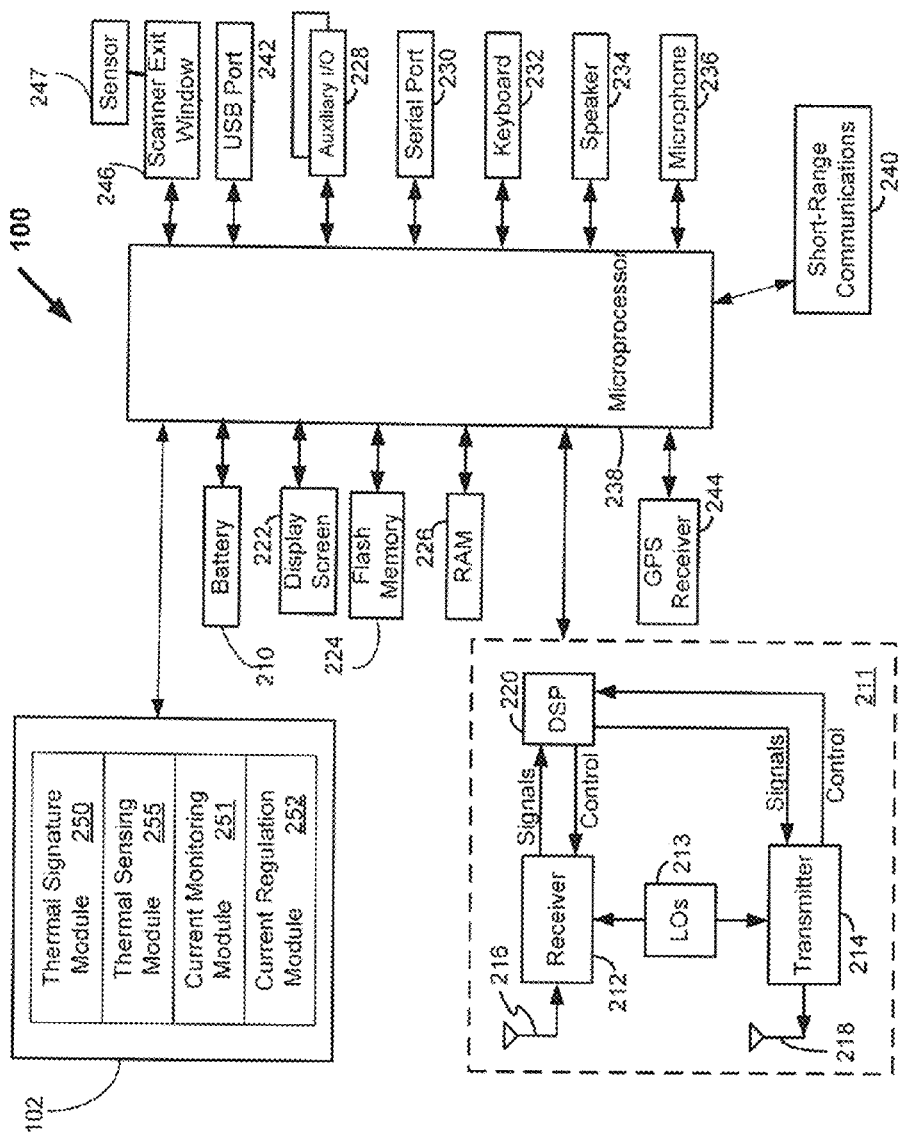
FIG. 2 is an exemplary conceptual diagram illustrating an embodiment of the components and functional subsystems of the handheld device.

Referring now to FIG. 2, handheld device 100 may include a radio frequency (RF) communication subsystem 211, which includes a receiver 212, a transmitter 214, and associated components, such as one or more embedded or internal antenna elements 216 and 218, local oscillators (LOs) 213, and a processing module such as a digital signal processor (DSP) 220. As will be apparent to those skilled in field of communications, the particular design of the RF communication subsystem 211 depends on the communication network in which handheld device 100 is intended to operate, but may include communication functionalities such as radio-frequency identification (RFID), Wi-Fi WLAN based on 802.11 standards, and the like.

Handheld device 100 includes a microprocessor 238 which controls general operation of handheld device 100. The microprocessor 238 also interacts with functional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240 such as a Bluetooth™ transceiver, for example, and a Universal Serial Bus (USB) expansion port 242 for peripherals. Handheld device 100 may include a power source 210, such as a rechargeable battery which may also be removable and replaceable from the handheld device. Handheld device 100 may also include a positioning device 244, such as a GPS receiver for example, for receiving positioning information.

Operating system software used by the microprocessor 238 may be stored in a persistent store such as the flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

The microprocessor 238, in addition to its operating system functions, enables execution of software applications on handheld device 100. A predetermined set of applications, which control basic device operations, may be installed on handheld device 100 during its manufacture. These basic operations typically include data and voice communication applications, for example. Additionally, applications may also be subsequently loaded onto handheld device 100 through the communication subsystem 211, an auxiliary I/O subsystem 228, serial port 230, USB port 242, short-range communications subsystem 240, or any other suitable subsystem, and installed by a user in RAM 226, or the persistent store 224, for execution by the microprocessor 238. Such flexibility in application installation increases the functionality of handheld device 100 and may provide enhanced on-device features, communication-related features, or both.

The display screen 222, such as a liquid crystal display (LCD) screen, may be used to visually present an application's graphical user interface (GUI) to the user. The user can manipulate application data by modifying information on the GUI using an input device such as the keyboard 232 for example. Depending on the type of handheld device 100, the user may have access to other types of input devices, such as, for example, a scroll wheel, trackball, light pen or touch sensitive screen.

The handheld device subsystems discussed in the preceding few paragraphs may be regarded as distinct functional subsystems. For instance, the display screen 222, the keyboard 232, scanner exit window 246, Wi-Fi radio subsystem 211, USB expansion port 242 and serial expansion port 230 may be regarded as functional subsystems directed to performing their respective distinct or identifiable function of handheld device 100.

Thus, the term functional subsystem as used herein refers to a component or a grouping of components, electronic and/or mechanical, which are capable of performing an identifiable function pertaining to operation of the handheld device. Furthermore, each individual functional subsystem as described herein requires electrical power for its functioning, consumes electrical power during its operation, and comprises a thermal mass based on its inherent thermal characteristics. The functional subsystems may include supplemental heating componentry, such as heat generating electrically resistive elements or strips, to supplement the heat inherently generated by any given component of the functional subsystem.

Thermal management module 102 may comprise thermal signature module 250, thermal sensing module 255, current monitoring module 251 and current regulation module 252. It is contemplated that thermal management module 102 may be implemented on the main host central processing unit (CPU) of handheld device 100, or on a separate processor device associated with handheld device 100.

Thermal signature module 250 may comprise a lookup table stored in any device memory, such as flash memory 224 or RAM 226, and in which the thermal and power-related characteristics of the various functional subsystems of the handheld device are defined and tabulated. Power-related characteristics may comprise, for example, power consumption during the ON state, the OFF state (if applicable), and voltage and current operating characteristics during start up, idling and/or shut down as applicable. Such power-related characteristics are typically pre-determined by the manufacturer of a given peripheral device or of a functional subsystem (such as display screen 222, Wi-Fi radio subsystem 211, scanning exit window 246, and keyboard 232, for example) of the handheld device, and are published in the respective manufacturer's specifications. As will be apparent to those of skill in the art, if not available from the manufacturer, power-related characteristics can also be determined empirically for functional subsystems and/or components therein.

The thermal signature of a component or functional subsystem may be determined based on the inherent thermal characteristics for that given component or functional subsystem of the handheld device and/or any compatible peripheral devices, catalogued, and stored in thermal signature module 250. Power-related thermal characteristics of supplemental heating elements incorporated within a functional subsystem may be similarly stored and aggregated with that respective functional subsystem. Based on a given component's or a functional subsystem's inherent thermal characterisitics such as thermal resistivity and thermal mass, it will be apparent to those skilled in the art that a given time-temperature relationship may be deduced for heating of that electrical component as a resulting of applying thereto a known electrical current at a known voltage level.

In cases where power-related characteristics and thermal characteristics may not be available from a manufacturer, calibration techniques for mapping and determining electrical power, voltage and current characteristics of functional subsystems, to their respective thermal characteristics are known in the art, and may be employed.

Thermal sensing module 255 provides temperature sensing capability for the various components and functional subsystems of handheld device 100, for example by, but not limited to, use of thermistors or solid state monolithic thermal sensors, appropriately co-located with the various components or located in a given functional subsystem circuitry. In an exemplary arrangement, FIG. 2 depicts thermal sensor 247 associated with scanner exit window 246. Reference herein to thermal sensing module 255 is intended to refer to thermal sensing capability in functional terms, and does not necessarily imply that the thermal sensing function and capability is physically centrally located within the handheld device. Peripheral or expansion devices which are electrically coupled to the handheld device may similarly include such temperature sensing capability. In general terms, thermal sensing module 255 includes the capability to sense prevailing ambient temperatures, and also actual operating temperatures of the various components and functional subsystems of handheld device 100.

Current monitoring module 251 provides the ability to monitor the current flows and power draw during operation of any functional subsystem or attached peripheral device of handheld device 100, and to do so relative to the available power of battery power source 210. The monitoring of actual power draw by current monitoring module 251 may be based on current flow measurements within the various functional subsystems. The power draw and current flow measurements are accessible to processor 238 of handheld device 100.

Current monitoring module 251 may be used to continuously sample and keep track of the power available from battery source 210 being used to power the functional subsystems of handheld device 100, beginning from a device power on event. As the battery power may be depleted continuously during operation of handheld device 100, current monitoring module keeps track of the available amount of power remaining at any given time, given current flows across all components and functional subsystems.

It is contemplated that the thermal management scheme described herein is intended to apply both to a transient startup condition and also to ongoing operating condition of handheld device 100. Current regulation module 252 provides the ability to change the power consumption state of any functional subsystem of the handheld device 100 or of a peripheral device, in order to allocate, or re-allocate if necessary, electrical power amongst the various functional subsystems including peripheral expansion ports. This may be accomplished using any combination of electronic hardware (voltage regulators, current regulating components, and on/off circuits and switches, for example), firmware and software. Changing the power consumption state may comprise, in the extreme, switching a functional subsystem or attached peripheral device from an OFF state to an ON state, and vice versa.

In other cases, changing the power consumption state may comprise ramping up, or ramping down, the power consumption, without switching to an extreme ON or OFF state. For example, display screen 222 may be suitably dimmed to reduce its power consumption and current flow thereto, in order that the reduced power may be re-allocated or made available to another functional subsystem of handheld device 100 or to any peripheral devices electrically coupled via any of expansion ports 242, 230, 228. In another example, processor 238 may be ramped down to a slower processor cycle rate, or even switched to a sleep mode, in order to reduce its power and current consumption, whereby that reduction in current flow can be re-allocated and re-directed by current regulation module 252 towards heating of components, functional subsystems or electrically coupled peripherals within a given thermal management context.

It is contemplated that current regulation module 252 may be programmed with rules for determining which components and functional subsystems are ramped down or switched off in power usage, and also in what order or priority these changes in electrical current flow are re-allocated and applied to the electrical components and functional subsystems that require heating. This allows a user of the device, or system administrator of the device, to set priorities for heating of any selected components, functional subsystems, peripherals or expansion ports, in a case where competing demands for heating arise.

In another variation, in lieu of programmed rules for automatic operation, thermal management module 102 may work in conjunction with processor 238 and the operating system software of handheld device 100 to present the user with options, such as via a software menu list displayed on display screen 222, for selecting which functional subsystems should be ramped down or switched off, and in what order, upon detection of a thermal management event, such as a device power on event The term thermal management event as used herein means receiving an indication that a user wishes to operate the handheld device, optionally including an electrically coupled peripheral, upon a power on or ongoing operation, in surroundings where the ambient temperature is lower than a stated or otherwise predetermined operating temperature of at least one component or functional subsystem of handheld device 100 or at least of one peripheral device electrically coupled to handheld device 100.

In yet another variation, it is contemplated that some hybrid of the automatic rules and manual user selection, discussed immediately above, may be implemented.

Viewed another way, upon a user of handheld device 100 initiating operation thereof within sub-zero temperatures requiring component heating, one or more of the functional subsystems may be subjected to reduced/increased current, switched off/on current, or any appropriate combination thereof. To the extent that the current to one component or functional subsystem is reduced, that amount of current may then be diverted to heat another component or functional subsystem, according to the priority rules the user may have established as discussed above.

A thermal management event may be automatic, or automatically inferred. For example, the act of a user powering on handheld device 100 may trigger a thermal management event associated with the scanner exit window 246 functional subsystem if is determined that operation of optical scanning functionality is being invoked while the scanner exit window 246 is fogged up in reaction to subzero ambient conditions, due to the ambient temperature being colder than the manufacturer's specified minimum operating temperature of the scanner.

It is also contemplated that a thermal management event may be manually initiated. For example, the user may be presented with a list of functional subsystems, such as via a software menu list graphically displayed on display screen 222. In this case, the user may proceed to select any of the choices given, in order to invoke thermal heating of the selected functional subsystem.

In another variation of the automatic thermal management event scenario discussed above, a separate peripheral digital scanner device attached by the user may include its own self-contained power source, typically a battery. Upon attachment of the peripheral digital scanner device to an expansion port 242, 230 of handheld device 100, current monitoring module may be programmed to test the power state of the peripheral digital scanner device in order to determine the amount of its self-contained power remaining.

However, current monitoring module 251 in conjunction with processor 238 may determine that the power available or remaining in that self-contained source is not sufficient to provide an electrical current sufficient for heating of electrical components of the peripheral digital scanner device for operation via the expansion port. In such case, it is contemplated that processor 238 in conjunction with thermal management module 102 may determine the deficit in power draw attributable to proper operation of the peripheral digital scanner, and draw at least that amount of power from the battery source of handheld device 100, to heat components of the peripheral device to a temperature above their respective specified minimum operational temperature, via the expansion port.

Figure 3:
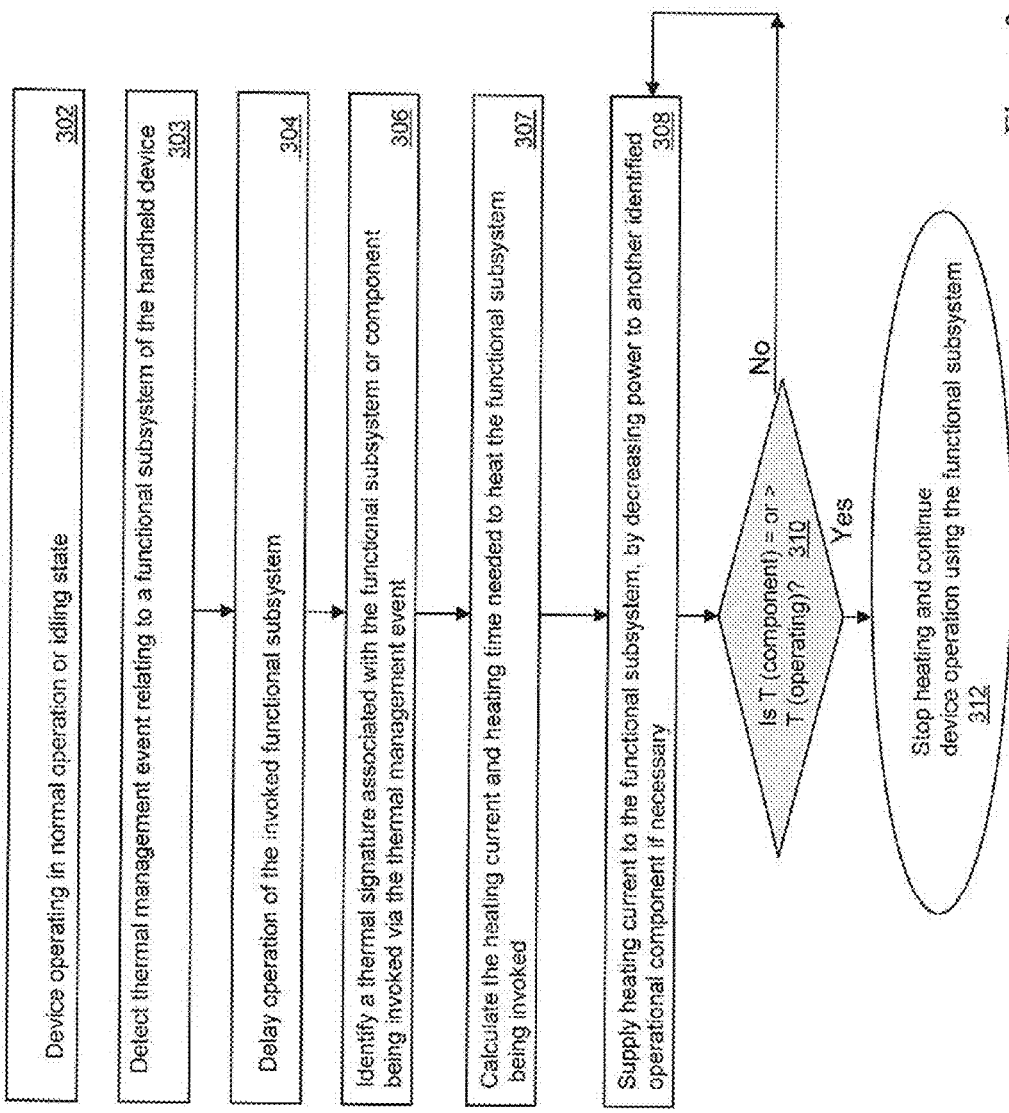
FIG. 3 illustrates a flowchart of an exemplary thermal management scheme for the handheld device in a normal operational or idling mode.

FIG. 3 illustrates a flowchart of an exemplary thermal management scheme for the handheld device in a normal operational or idling mode. At step 302, the operation of handheld device 100 is already underway. At step 303, a thermal management event is detected, such as a user request or attempt to use a scanner exit window function in low ambient temperature conditions. At step 304, operation of the invoked scanner window functional subsystem is delayed, pending application of heating current to that functional subsystem. At step 306, the thermal signature associated with the scanner window functional subsystem is identified. At step 307, the heating current and heating time to required bring that functional subsystem to a proper operating level are calculated.

Then at step 308, the heating current is started. If the power available in the handheld device is not sufficient, then the power may be reduced in another of the currently operating functional subsystems or other components. The reduced power may be reallocated and redirected for heating of the invoked functional subsystem to the predetermined proper operating temperature. The above steps may be repeated with regard to another functional subsystem, such that the cumulative reallocated and redirected power will be at least sufficient for effective heating of any invoked functional subsystem. At step 310 a determination is made as to whether the temperature of the functional subsystem has reached its recommended operating temperature. Finally, at step 312, it is determined whether the heating should be terminated; for instance, such as when the estimated heating time to achieve minimum operating temperature of the heated component(s) is reached, based on heating current applied, supply voltage, component thermal resistivity and ambient temperature.

In a variation of the process of FIG. 3, the functional subsystem may comprise a peripheral device. Thermal management may be provided for the handheld device being used in conjunction with a peripheral device, where the thermal event is associated with receiving an indication of a peripheral device being attached at an expansion port of the handheld device, such as via a USB port, a serial port, or an I/O card expansion card slot. A thermal signature associated with operation of the peripheral device may be identified from the predetermined catalogued values stored at thermal signature module 250. In this instance, the thermal signature of the peripheral device may be taken as the predetermined thermal signature of at least one key electronic component of the peripheral device. If it is determined that the available power is insufficient to heat the peripheral device via the expansion port in accordance with the predetermined thermal signature, then a power state of another of the alternative functional subsystems is reduced. The electrical current flow as a result of that reduction in power may then be redirected for heating of the peripheral device via the expansion port.

Figure 4:
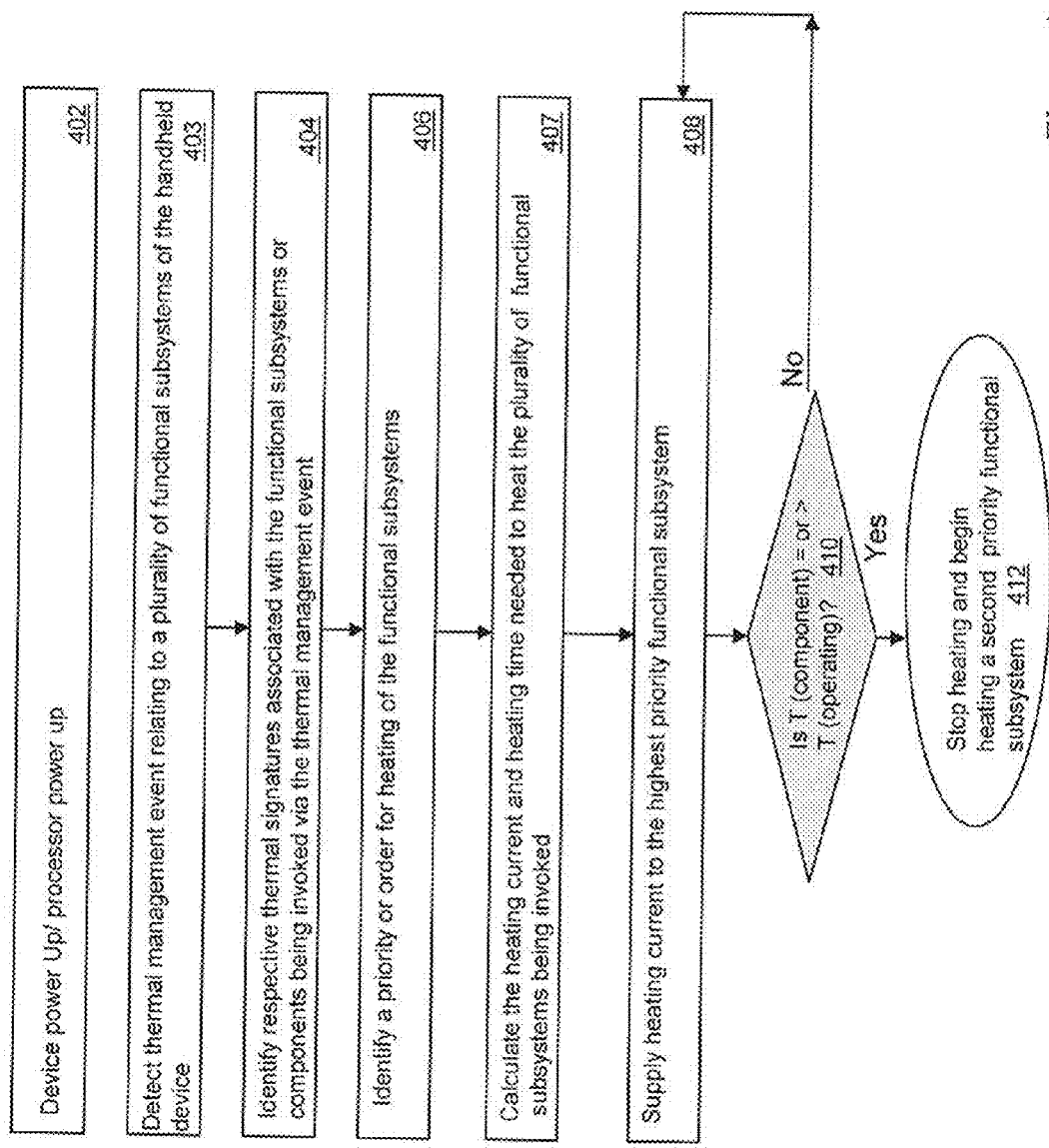
FIG. 4 illustrates a flowchart of an exemplary thermal management scheme for startup of the handheld device.

FIG. 4 illustrates a flowchart of an exemplary thermal management scheme for startup of the handheld device.

At step 402, there is received a device power-on event at handheld device 100. At step 403, a thermal management event relating to, or invoking, one or more functional subsystems of the handheld device is detected. If handheld device 100 is being powered-on, the thermal management event may relate to an attempt to invoke several functional subsystems at once as handheld device 100 starts and the thermal management scheme of the present invention manages that process. It will be understood by those skilled in the art that the processor and memory of handheld device 100 always get powered on first, since that core is central to the thermal management process described herein. If handheld device 100 is already powered on, the thermal management event can relate to a peripheral being attached or started, a change in ambient temperature, and such.

At step 404, thermal signature module 250 is used to identify a thermal signature of the invoked functional subsystem (or subsystems), such as scanner exit window 246.

At step 406, a decision is made to defer operation of the invoked functional subsystem, in preparation for heating of the invoked functional subsystem to its rated operating temperature.

At step 407, the heating current and estimated heating time are determined, based on the thermal signature of the component or functional subsystem involved.

At step 408, power is supplied to the functional subsystem associated with the thermal management event for heating.

At step 410, it is determined by thermal sensing module 255 whether or not the functional subsystem associated with the thermal management event has been heated to at least its rated operating temperature. If the rated operating temperature is not yet reached, then the heating current is continued at step 408. If, at step 410, it is determined that the rated operating temperature is reached, then at step 412, the heating current is terminated, and usual operation of the invoked functional subsystem is commenced.

In this manner, start of normal operation of handheld device 100 may be delayed until the functional subsystem associated with the thermal management event is heated into an operationally safe zone. It is also contemplated that the exemplary sequence of steps described above may varied, as will be apparent to those skilled in the art.

Although a handheld computer has been used to establish a context for disclosure herein, it is contemplated as having much wider applicability within the field of thermal management; for instance, to mobile electronic instrumentation. Furthermore, the disclosure herein has been described with reference to specific exemplary embodiments; however, varying modifications thereof will be apparent to those skilled in the art without departing from the scope of the invention as defined by the appended claims.

What is claimed is:

1. A method of providing thermal management for a handheld device powered by a power source, the power source having an available power amount, the handheld device including a plurality of functional subsystems, the method comprising:

receiving, at a processor of the handheld device, an indication of a thermal management event at the handheld device related to heating of at least one functional subsystem of the plurality of functional subsystems, wherein the thermal management event comprises selection of a peripheral device among the plurality of functional subsystems, wherein the selection of the peripheral device for operation comprises selecting the peripheral device from among a menu list of choices presented at a graphical display screen of the handheld device;

identifying, by the processor, a predetermined thermal signature stored in a non-transitory memory and associated with operation of the peripheral device, the thermal signature including a predetermined minimum operating temperature for the peripheral device;

delaying, by the processor, a start of normal operation of the peripheral device; and applying, by the processor, a heating current to heat the peripheral device until the peripheral device is heated to a temperature at least equal to the predetermined minimum operating temperature of the peripheral device.

2. The method of claim 1 wherein the power source of the handheld device comprises at least one battery.

3. The method of claim 1 wherein the thermal management event comprises attachment of a peripheral device to a peripheral expansion port of the handheld device, and the at least one functional subsystem comprises that attached peripheral device.

4. A method of providing thermal management for a handheld device powered by a battery, the battery having an available power amount, the handheld device having a plurality of functional subsystems, the method comprising:

receiving, at a processor of the handheld device, an indication of a peripheral device being attached at an expansion port of the handheld device;

identifying, by the processor, a predetermined thermal signature stored in a non-transitory memory and associated with operation of the peripheral device;

determining, by the processor, whether the available power amount is sufficient to heat the peripheral device in accordance with the predetermined thermal signature;

reducing, by the processor, a power state of at least one of the plurality of functional subsystems upon determining that the available power is insufficient to heat the peripheral device in accordance with the predetermined thermal signature; and redirecting, by the processor, the reduced power to the peripheral device, via the expansion port, to heat the peripheral device in accordance with the predetermined thermal signature.

5. The method of claim 4 wherein the predetermined thermal signature includes a predetermined minimum operating temperature of at least one electronic component of the peripheral device.

6. The method of claim 4, wherein upon receiving an indication of a peripheral device being attached at an expansion port, further comprises receiving a selection for a peripheral device to be operated from among a software menu of options presented at a display screen of the handheld device.

7. The method of claim 4, wherein the expansion port is selected from a group of expansion ports consisting of a USB port, a serial port and an input/output expansion card slot.

8. A method of providing thermal management for a handheld device powered by a power source, the power source having an available power amount, the handheld device comprising a plurality of functional subsystems, the method comprising:

receiving, at a processor of the handheld device, an indication of a thermal management event at the handheld device related to operation of at least one functional subsystem of the plurality of functional subsystems;

delaying, by the processor, a start of normal operation of the at least one functional subsystem;

identifying, by the processor, a predetermined thermal signature stored in a non-transitory memory and associated with operation of the at least one functional subsystem;

determining, by the processor, whether the available power amount is sufficient to heat the at least one functional subsystem in accordance with the predetermined thermal signature;

reducing, by the processor, a power state of at least a second functional subsystem of the plurality of functional subsystems upon determining that the available power is insufficient to heat the at least one functional subsystem; and directing, by the processor, the reduced power to heat the at least one functional subsystem of the handheld device.

9. The method of claim 8 further comprising the step of delaying the start of normal operation until the at least one functional subsystem is heated to a temperature at least equal to the predetermined minimum operating temperature.

10. A handheld device comprising:

a processor;

an expansion port for coupling a peripheral device to the handheld device, the expansion port coupled to the processor;

a battery power source comprising an available power amount, the battery source for powering a plurality of functional subsystems of the handheld device; and a memory coupled to the processor having instructions stored thereon for execution by the processor, the memory comprising instructions for:

receiving an indication of a thermal management event at the handheld device related to heating of at least one functional subsystem of the plurality of functional subsystems, wherein the thermal management event comprises selection of the peripheral device among the plurality of functional subsystems, wherein the at least one functional subsystem comprises a graphical display screen and the selection of the peripheral device for operation comprises selecting the peripheral device from among a menu list of choices presented at the graphical display screen;

identifying a predetermined thermal signature associated with operation of the peripheral device, the thermal signature including a predetermined minimum operating temperature for the peripheral device;

delaying start of normal operation of the peripheral device; and applying a heating current to heat the peripheral device until the peripheral device is heated to a temperature at least equal to the predetermined minimum operating temperature of the peripheral device.

11. The handheld device of claim 10 wherein the expansion port is selected from a group of expansion ports consisting of a USB port, a serial port and an input/output expansion card slot.

12. The handheld device of claim 10, wherein the battery power source comprises a rechargeable battery.

13. The handheld device of claim 10, including a functional subsystem comprising a display screen.

14. The handheld device of claim 10, including a functional subsystem comprising a keyboard.

15. The handheld device of claim 10, including a functional subsystem comprising a scanner exit window.

16. The handheld device of claim 10, including a functional subsystem comprising a wireless radio subsystem.

* * * * *